(12) United States Patent
Gupta et al.

(10) Patent No.: US 11,774,407 B2
(45) Date of Patent: Oct. 3, 2023

(54) UAV-BASED ACOUSTIC TECHNIQUE FOR MAPPING DEFECTS IN CIVIL INFRASTRUCTURE

(71) Applicant: UVic Industry Partnerships Inc., Victoria (CA)

(72) Inventors: Rishi Gupta, Victoria (CA); Harsh Rathod, Victoria (CA)

(73) Assignee: UVic Industry Partnerships Inc., Victoria (CA)

( * ) Notice: Subject to any disclaimer, the term of this patent is extended or adjusted under 35 U.S.C. 154(b) by 481 days.

(21) Appl. No.: 17/051,742

(22) PCT Filed: May 3, 2019

(86) PCT No.: PCT/IB2019/053618
§ 371 (c)(1),
(2) Date: Oct. 29, 2020

(87) PCT Pub. No.: WO2019/211800
PCT Pub. Date: Nov. 7, 2019

(65) Prior Publication Data
US 2021/0123888 A1    Apr. 29, 2021

Related U.S. Application Data

(60) Provisional application No. 62/666,512, filed on May 3, 2018.

(51) Int. Cl.
*G01N 29/14* (2006.01)
*B64C 39/02* (2023.01)
(Continued)

(52) U.S. Cl.
CPC ........... *G01N 29/14* (2013.01); *B64C 39/024* (2013.01); *G01N 29/4463* (2013.01);
(Continued)

(58) Field of Classification Search
CPC .............. G01N 29/14; G01N 29/4463; G01N 2291/0289; G01N 29/265; G01N 29/46;
(Continued)

(56) References Cited

U.S. PATENT DOCUMENTS 8,775,013 B1 *  7/2014  Smailus ................... B64F 5/60
                                                   701/31.4
9,685,089 B2 *  6/2017  Paczan ...................... G01S 5/18
(Continued)

FOREIGN PATENT DOCUMENTS

CN        106053599     10/2016
EP        3 267 189      1/2018
(Continued)

OTHER PUBLICATIONS

International Search Report and Written Opinion from International Application No. PCT/IB2019/053618, dated Sep. 16, 2019, 8 pages.
(Continued)

*Primary Examiner* — Jacques M Saint Surin
(74) *Attorney, Agent, or Firm* — Klarquist Sparkman, LLP

(57) ABSTRACT

Unmanned Aerial Vehicles (UAVs) are provided with hammers having contact surfaces to produce acoustic signals in structures to be inspected. By selecting a suitable flight path, the contact surface can be dragged across or tapped against the structure to produce acoustic signals indicative of structure condition. Acoustic detectors are coupled to the UAV to produce detected acoustic signals that can be stored, communicated, and/or processed to access to arbitrary structure surfaces, including bottom surfaces of bridge decks and to locate delaminations.

25 Claims, 8 Drawing Sheets

(51) Int. Cl.
*G01N 29/44* (2006.01)
*B64U 101/00* (2023.01)

(52) U.S. Cl.
CPC .. *B64U 2101/00* (2023.01); *G01N 2291/0232* (2013.01); *G01N 2291/0289* (2013.01)

(58) Field of Classification Search
CPC .......... G01N 29/045; G01N 2291/0232; B64C 39/024; G01H 13/00; G01H 1/00; G01M 5/0066; G01M 7/08; B64U 2101/00
USPC .......................................................... 73/587
See application file for complete search history.

(56) References Cited

U.S. PATENT DOCUMENTS

| | | | |
|---|---|---|---|
| 9,738,381 B1* | 8/2017 | Loud .......................... | B64B 1/02 |
| 9,889,331 B2* | 2/2018 | Svenberg ........... | A63B 21/0728 |
| 10,053,236 B1* | 8/2018 | Buchmueller ......... | G01N 29/14 |
| 10,620,002 B2* | 4/2020 | Al-Jabr .................. | G01B 17/02 |
| 2016/0011088 A1 | 1/2016 | Guthrie et al. | |
| 2016/0378105 A1 | 12/2016 | Tanigawa | |
| 2017/0074830 A1 | 3/2017 | Bellotti et al. | |
| 2018/0372580 A1* | 12/2018 | Takamine ............ | G01N 29/045 |

FOREIGN PATENT DOCUMENTS

| | | |
|---|---|---|
| JP | 2012145346 | 8/2012 |
| JP | 2015-219028 | 12/2015 |
| WO | WO 2017/204050 | 11/2017 |

OTHER PUBLICATIONS

Iwamoto et al., "Development of testing machine for tunnel inspection using multi-rotor UAV," IOP Conf. Series: Journal of Physics, 842:1-7 (2017).
Extended European Search Report for related EP Application No. 19796289.7, 8 pages, dated Nov. 26, 2021.

* cited by examiner

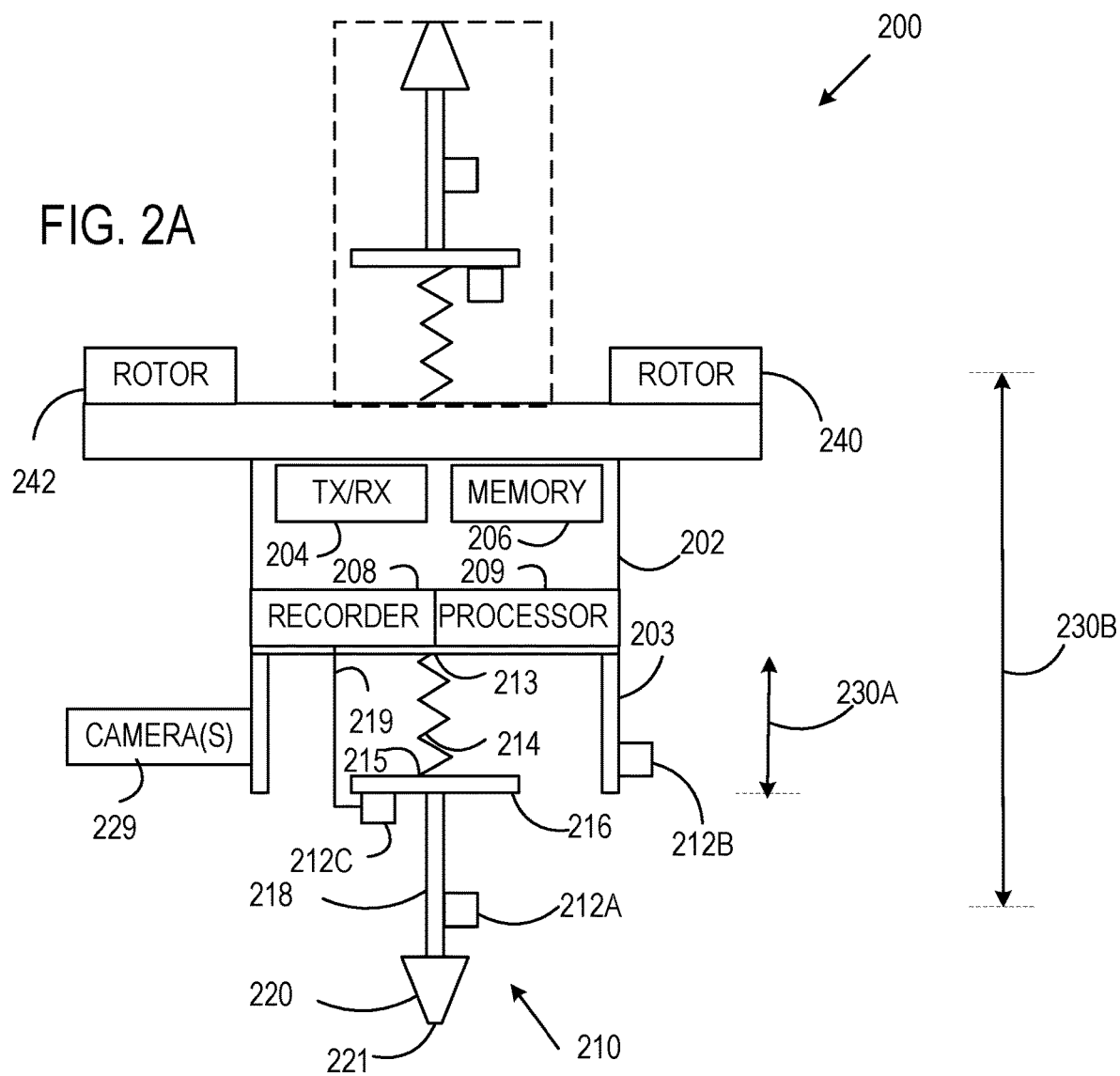

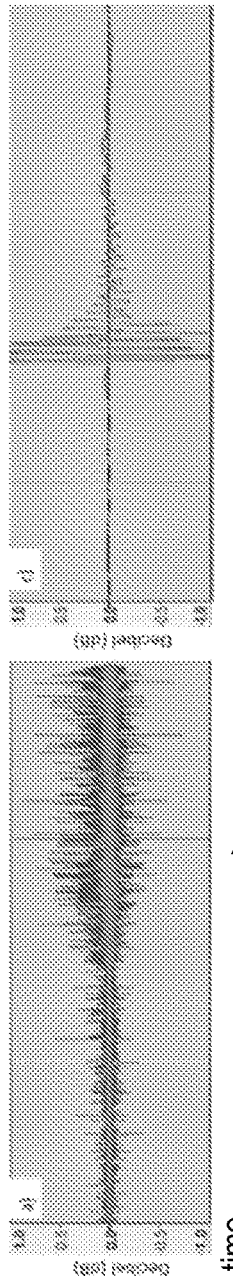
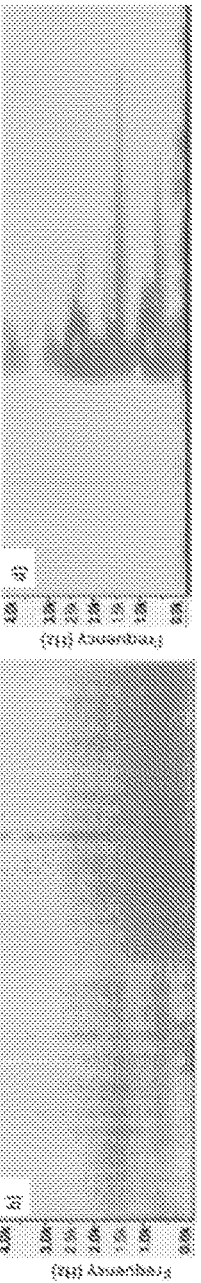
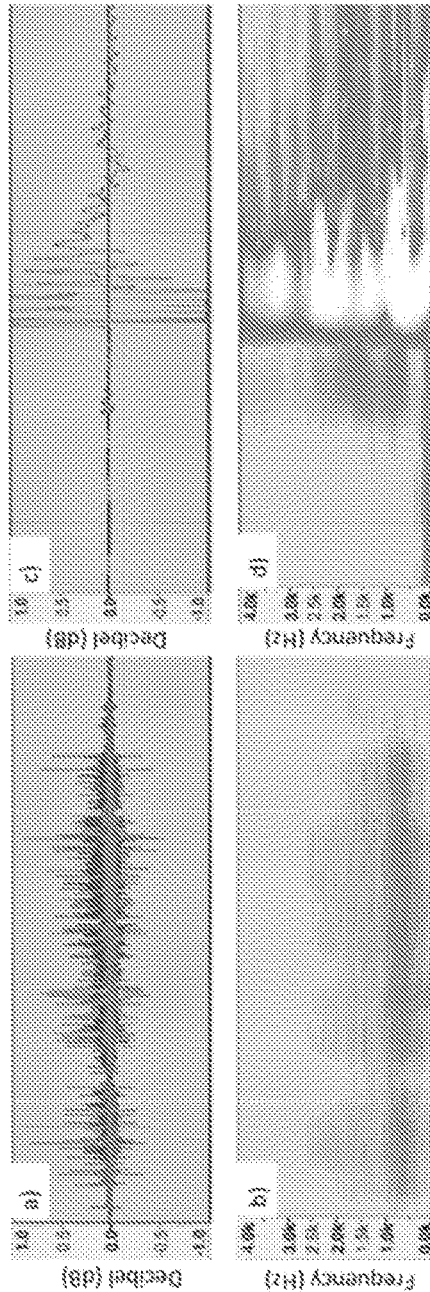
FIG. 5A  FIG. 5B  FIG. 6A  FIG. 6B  FIG. 7A  FIG. 7B  FIG. 8A  FIG. 8B
DRAG TEST  TAP TEST

UAV-BASED ACOUSTIC TECHNIQUE FOR MAPPING DEFECTS IN CIVIL INFRASTRUCTURE

CROSS REFERENCE TO RELATED APPLICATION APPLICATIONS

This is the U.S. National Stage of International Application No. PCT/IB2019/053618, filed May 3, 2019, which was published in English under PCT Article 21(2), which in turn claims the benefit of U.S. Provisional Application No. 62/666,512, filed May 3, 2018, which is hereby incorporated by reference in its entirety.

FIELD

The disclosure pertains to inspection of bridges and other structures.

BACKGROUND

Bridges are one of the most important infrastructure assets of any country as they provide connectivity links for industrial and domestic needs and are estimated to movement of millions of vehicles every day. Given their importance, timely monitoring of bridge condition is needed to ensure safety and serviceability.

While many bridge defects are of concern, one of the most common defects found in bridges including reinforced concrete bridge decks is delamination. Several Non-Destructive Testing (NDT) techniques, both contact and non-contact, have been used to map delaminations. Typical methods include Ground Penetrating Radar (GPR), Infrared Thermography, chain drag and other stress-wave methods. GPR is a very accurate method for mapping delaminations, but requires lane closures during inspection and is not convenient for inspecting the bottom of a bridge deck. The non-contact nature of Infrared Thermography makes it useful in mapping delaminations in a bridge deck without requiring bridge closure. However, this method is sensitive to climatic conditions such as temperature and wind. The chain drag method is the most widely used technique due to its simplicity and low cost. This method uses an acoustic signal processing unit to accurately map delaminations. Unfortunately, this technique does not permit inspection of a bridge deck element from the bottom side. Improved approaches are needed.

SUMMARY

Some examples are described below, and the features of any of these examples can be used in the other situations as well. In one example, methods include positioning an acoustic signal generator with respect to a selected region of a structure with an unmanned aerial vehicle (UAV). The acoustic signal generator is connected to the UAV and an acoustic signal is coupled into the structure at the selected region using the acoustic signal generator. With an acoustic detector connected to the UAV, at least one acoustic signal received from the structure is detected that is responsive to the acoustic signal coupled to the structure. In some examples, the detected acoustic signal is transmitted to a ground-based receiver. In typical embodiments, the detected acoustic signal is processed to identify one or more portions of the structure as having a structural anomaly. In representative examples, the acoustic signal generator includes a hammer having a contact surface, and the UAV is moved so that the contact surface of the hammer contacts a surface that is acoustically coupled to the selected region of the structure. In some approaches, the acoustic signal is coupled into the structure by dragging the contact surface of the hammer with the UAV. According to some implementations, the hammer is a ball end that is stiffly coupled to the UAV.

In still further examples that can be combined with any other examples, the acoustic signal generator includes a hammer such as a ball end having a contact surface, and the UAV is moved so that the contact surface of the hammer taps a surface that is acoustically coupled to the selected region of the structure. For convenience, the hammer can be coupled to the UAV with a spring. According to representative alternatives, first and second acoustic signals are detected with first and second acoustic detectors connected to the UAV, respectively, wherein the first and second detected acoustic signals are responsive to the acoustic signal coupled to the structure. A difference signal is obtained based on the first and second detected signals, and one or more portions of the structure are identified as having a structural anomaly based on the difference signal. In some cases, an acoustic detector is situated at least 1 m from the UAV.

Inspection apparatus comprise a UAV and an acoustic signal generator coupled to the UAV. The acoustic signal generator includes a hammer having a contact surface situated with respect to the UAV to be movable by the UAV to produce an acoustic signal in a structure. An acoustic detector is coupled to the UAV and situated to receive acoustic signals from the structure in response to the acoustic signal produced in the structure. In some examples, the hammer comprises a ball end that can be secured to the UAV with a spring. An audio recorder can be coupled to the acoustic detector and configured to produce digital audio signals based on the acoustic signals received by the acoustic detector. In particular examples, a transmitter is coupled to audio recorder and operable to wirelessly transmit the digital audio signals. In some examples, a processor is fixed to the UAV and coupled to produce at least one spectrum based on the digital audio signals.

Additional features of any of the disclosed examples include that the acoustic detector comprises first and second acoustic detectors situated to have substantially the same acoustic coupling to the UAV and substantially different acoustic couplings to the contact surface of the hammer and/or the structure under inspection. The audio recorder can be coupled to produce digital audio signals based on a difference between detected audio signals from the first and second detectors, and the audio processor can produce the at least one spectrum based on the difference.

In a specific example (which may also include any or all of the features described above), methods comprise moving a hammer with an unmanned aerial vehicle (UAV) so as to drag a contact surface of the hammer or tap the contact surface of the hammer on a region of a surface of a structure to apply an acoustic signal to the structure. At least one acoustic signal from the structure produced in response to the applied acoustic signal is detected with at least one microphone that is secured to the UAV. Based on a spectrum of the detected acoustic signal, a location of a structural defect in the structure is indicated.

Inspection apparatus comprise a UAV and a hammer connected to the UAV. At least one microphone is secured to the UAV and an audio recorder is coupled to the at least one microphone to receive an acoustic signal from a structure produced in response to dragging or tapping the contact surface of the hammer on the structure. A corresponding digital acoustic signal is stored in a computer readable medium, and a processor is coupled to receive the digital acoustic signal, reduce UAV noise in the digital acoustic signal, and produce at least one spectrum associated with the noise-reduced digital acoustic signal. A structural defect such as a delamination is identified based on the spectrum or otherwise based on the noise-reduced digital acoustic signal.

The foregoing and other features and advantages of the disclosed technology will become more apparent from the following detailed description, which proceeds with reference to the accompanying figures.

BRIEF DESCRIPTION OF THE DRAWINGS

FIG. 2A illustrates an apparatus that deliver acoustic signals to a structure for structure evaluation.

FIGS. 5A-5B illustrate unprocessed detected acoustic signal data (single channel) obtained by a drag test (FIG. 5A) and a tap test (FIG. 5B) in evaluation of a concrete slab that includes voids.

FIGS. 6A-6B show spectra as a function of time corresponding to the detected acoustic signals of FIG. 5A-5B, respectively.

FIGS. 7A-7B illustrate unprocessed detected acoustic signal data obtained by a drag test (FIG. 7A) and a tap test (FIG. 7B) in evaluation of a control concrete slab without voids.

FIGS. 8A-8B show spectra as a function of time corresponding to the detected acoustic signals of FIGS. 7A-7B.

DETAILED DESCRIPTION

Figure 1A:
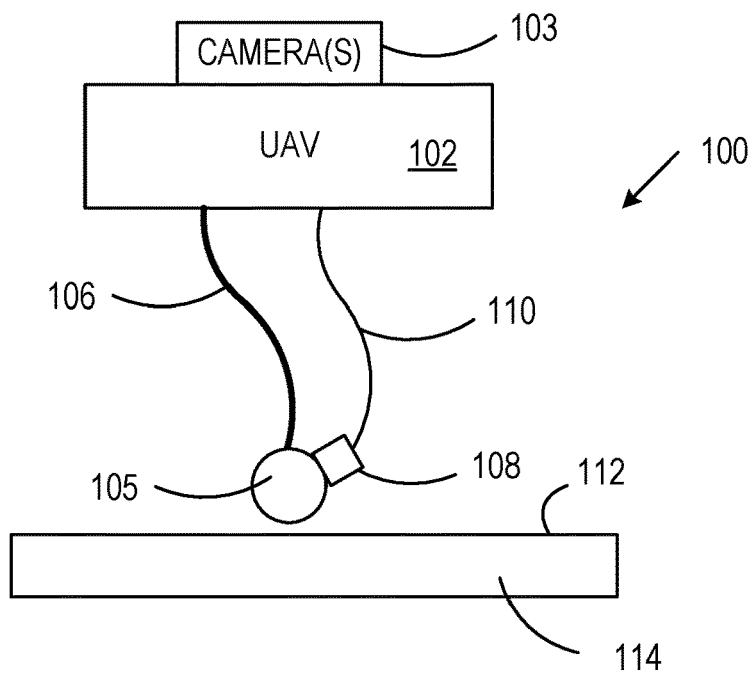
FIGS. 1A-1C illustrate UAV-based acoustic data collection on an upper surface of a bridge deck, on a side of a deck slab, and on bottom surface, under the deck slab, respectively.

The disclosure pertains to methods and apparatus for inspection and evaluation of bridges and other structures. In typical examples, Unmanned Aerial Vehicles (UAVs) are used to permit access to arbitrary surfaces of a structure under evaluation. However, use of UAVs is optional and the disclosed approaches can be implemented in other ways.

In some examples, steel ball points or other devices are placed into contact with a region of interest in a structure undergoing test. Other devices can be used, such as metal pieces of other shapes, stone, or ceramics or other materials preferably robust enough to be used to contact a surface periodically. Steel balls or other hard metallic shapes are convenient. Spherical or curved shapes are not required but can be advantageous. Objects situated to tap a surface, drag across a surface, or otherwise interact with a structure or a surface of stricture are referred to as "hammers" herein. UAVs are controlled so that hammers contact a surface associated with structure to be inspected. Typical contacts are referred to as "tapping" in which a single contact or series of contacts are applied or "dragging" in which a hammer surface is urged into contact with the surface while being moved across the surface. The associated methods are referred to a "tap" or "tapping" method and a "drag' or dragging" method.

As used herein, "acoustic signals" generally refers to propagating sound waves while "detected acoustic signals" refers to corresponding electrical signals produced with an acoustic detector such as a microphone, a piezoelectric transducer, or other sound detector. Examples are described with reference to acoustic detectors, but it will be appreciated that in typical frequency ranges of interest (less than about 5-10 kHz), microphones are particularly convenient due to their wide availability and low cost, but other acoustic detectors can be used. In many examples, time-domain acoustic signals are Fourier transformed (such as with an FFT) to produce signal spectra in a particular time window or as a function of time. "Detected signal" also refers to a digital representation such as stored in a computer readable medium, usually by directing time varying detected acoustic signals (i.e., a time varying electrical signals) to an analog-to-digital convertor (ADC). A detected acoustic signal from a single detector is referred to in some examples as a single channel signal, as it can be convenient to record acoustic signals from a structure under inspection using a stereo (2-channel) audio recorder to permit obtaining a difference signal using two or more acoustic detectors.

Some embodiments are described with reference to inspection of bridge decks. This is merely a representative example, and other structures and other components of structures can be similarly evaluated such as bridge piers, abutments, girders or components of dams, power plants, and buildings. The disclosed methods and apparatus can be used with any surface or structure for which acoustic signal based inspection is intended, and the disclosed approaches permit inspection of arbitrary surfaces (tops, sides, interiors, bottoms) that are accessible with a UAV. Various kinds of defects can be detected such as delaminations and subsurface defects such as cracks, voids, corrosion, and debonding, and inspection for delamination is only as a representative example.

Example 1

Figure 1B:
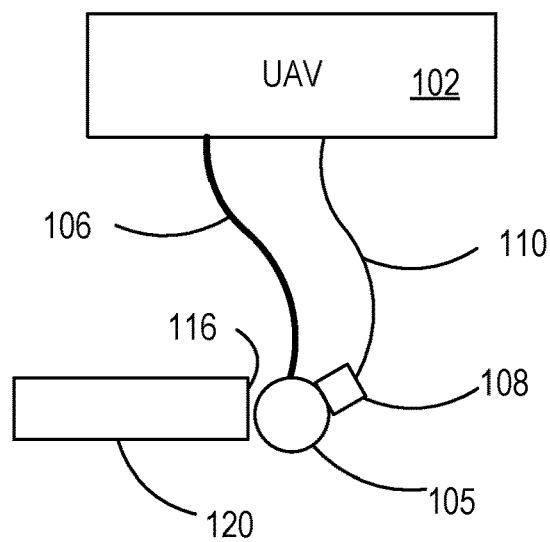
Figure 1C:
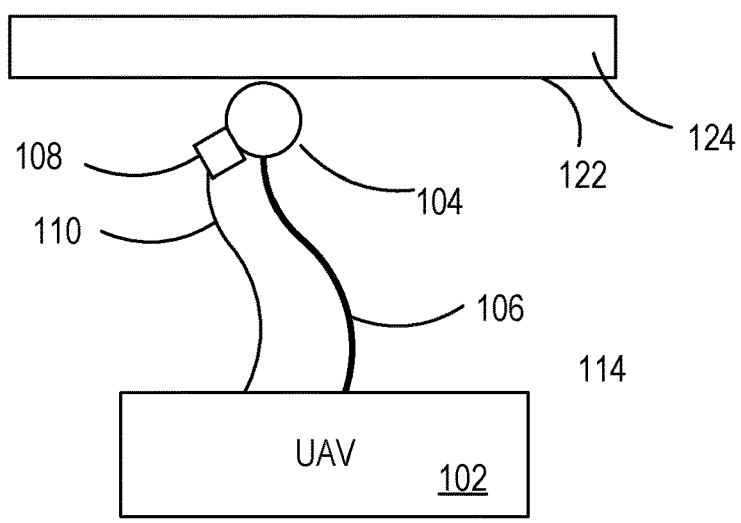

Referring to FIG. 1A, a structure test apparatus 100 comprises a UAV 102 to which one or more cameras 103 are secured. A steel ball point 105 is secured to the UAV 102 with a connector 106 such as a rigid or stiff rod. The ball point 105 is thus flexibly coupled to the UAV 102 but stiffly enough to be urged against a test surface. As acoustic transducer 108 is secured to the steel ball point 105 and is electrically coupled to the UAV 102 with a cable 110. In FIG. 1A, the steel ball point 105 is positioned proximate a surface 112 of a structure 114 such as a bridge deck. The UAV 102 is manipulated so that the steel ball point 105 contacts the surface 112 so as to either tap the surface or to drag the steel ball point 105 across the surface. An acoustic signal is produced in the structure, and portions returned from the structure are received by the detector 108, and the detected (electrical signals) are coupled to the UAV 102 for transmission to a fixed location or are processed at the UAV 102. FIG. 1B illustrates the apparatus 100 of FIG. 1B in position so that the steel ball point 105 contacts a side surface 116 of a substrate 120. In FIG. 1C, the apparatus 100 is positioned so that the steel ball point 105 contacts a bottom surface 122 of a substrate 124. In this example, the UAV flies below the structure 124 and is then directed upwards to provide contact.

The connector 106 that couples the steel ball point 105 to the UAV 102 can be metallic and have suitable stiffness to remain substantially fixed with reference to the UAV 102 but suitably flexible so that contact can be maintained in the presence of changes of surface topography. In apparatus that include a connector such as the connector 106, an object that is to contact a surface of a structure (such as a steel ball point) it typically dragged over the surface by movement of the UAV. In some cases, the object is made to tap the surface (often repetitively). Using either a drag or tap method, an acoustic signal is produced in the structure under test.

Example 2

FIG. 2A shows a representative test apparatus 200 that includes a UAV 202 have a transmitter/receiver 204 for data communication with fixed transmitters and receiver, a memory 206 that stores computer-executable instructions for data collection, processing, and communication, and an acoustic recorder 208 that receives acoustic signals and processes (with, for example, one or more amplifiers and filters), and then converts the acoustic signals to digital signals using an A/D convertor. In general, recorded (i.e., digital) data signals are further processed to produce superior structure evaluations, but for convenience herein, both analog and digital acoustic signals are referred to simply as "acoustic signals." A processor 209 can be coupled for noise reduction, digitization, filtering, Fourier transformations or other operations on the digital acoustic signal. The processor 209 can be implemented as a CPU, a gate array such as an FPGA, or other processing hardware. In some example, recorded data is transmitted for remote processing, and additional processing is not done at the UAV 202.

A contact assembly 210 is secured to the UAV 202 with a first end 213 of a spring 214 or other flexible member. A second end 215 of the spring 214 is fixed to a plate 216. An extension 218 such as a metal rod or other rigid element is coupled to the plate 216 and to a contact element 220. The contact element 220 can have a spherical, cylindrical, planar, or other shaped contact surface 221. One or more cameras 229 can be secured to the UAV 202, and one or more acoustic transducers 212A-212C are situated to receive acoustic signals from a substrate under test that are produced in response to contact with the contact surface 221.

In use, the UAV 202 is flown to urge the contact surface 221 against a surface of a structure (or other surface that couples acoustic signals to the structure under test). Typically, the UAV 202 repetitively contacts the structure with the contact surface 221 and responsive acoustic signals are detected by one or more of the acoustic detectors 212A-212C and coupled to the recorder 208 with respective cables such as cable 219. While either a drag or tapping method can be used to produce acoustic signals with the contact surface 221, the configuration of FIG. 2A is typically used to tap a surface of a structure. As discussed below, it can be desirable to have a distance 230A from the UAV 202 to the plate 216 and/or from representative UAV rotors 240, 242 sufficient so that rotor noise contributions are diminished. In addition, placement of multiple acoustic detectors can be arranged to reduce UAV noise contributions. In addition, some of the other techniques that can be used to reduce or account for noise include: use of directional microphones, measuring the external traffic noise separate from the UAV system (for subsequent cancelation), and using a previously recorded rotor acoustic pattern with a single microphone mounted on the UAV. The contact assembly 210 is shown secured to a side of the UAV 202 opposite the rotors 240, 242 but can be placed on the same side in the box as shown in the box defined with dotted lines.

Example 3

Figure 3:
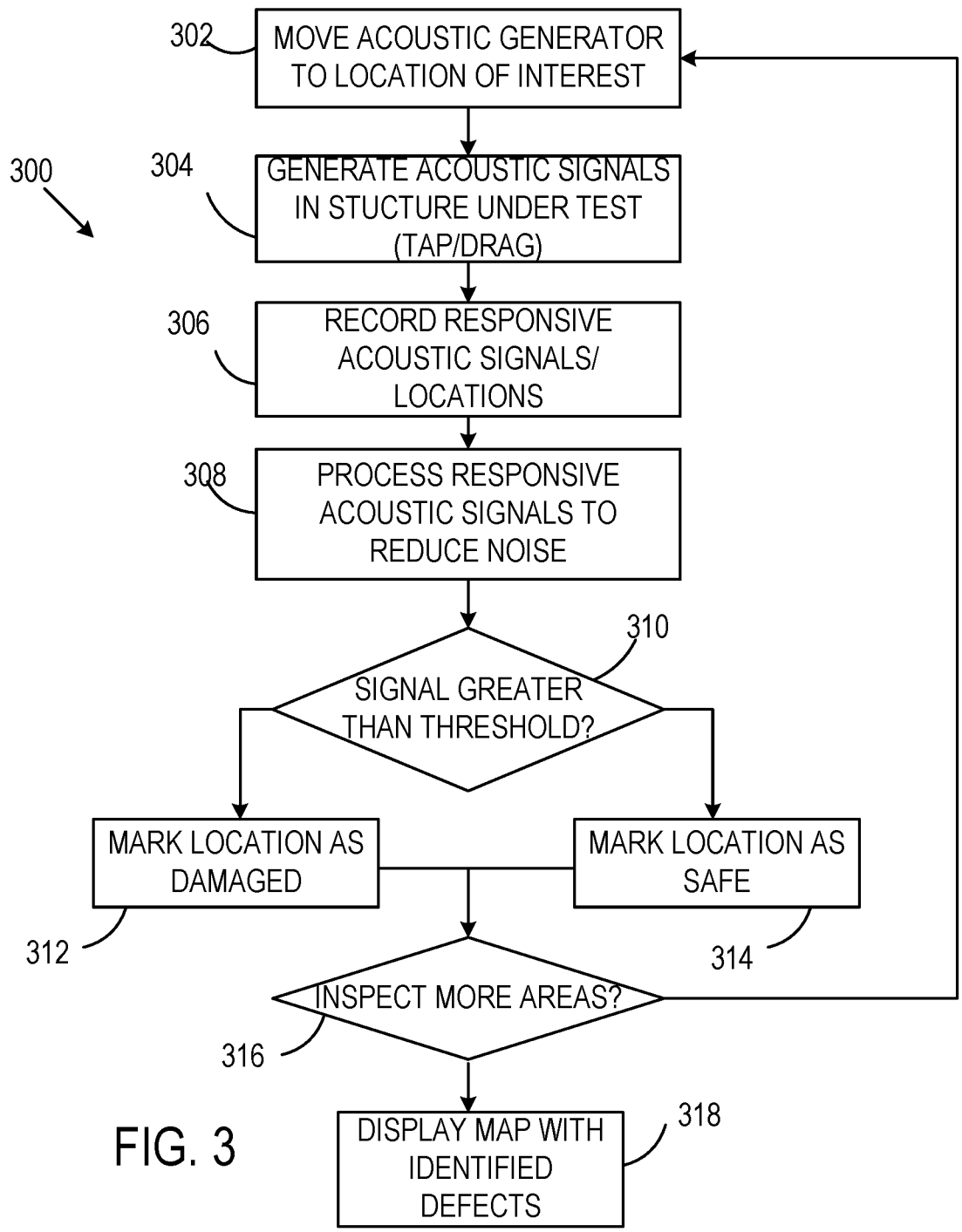
FIG. 3 illustrates a method of mapping defects in a bridge or other structure.

Referring to FIG. 3, a representative method 300 includes moving a contact assembly to a location of interest at 302 with a UAV, and generating an acoustic signal in a structure to be tested at 304, generally by dragging a hard object across the surface or tapping the surface with a hard object using the UAV. At 306, acoustic signals from the structure are detected and recorded, typically, by storing in a computer readable memory. At 308, noise contributions to the recorded acoustic signals are reduced, and at 310, acoustic signals having magnitudes greater that a user-adjustable or predetermined threshold are identified and areas associated with damage are marked at 312 while areas appearing satisfactory are marked as safe or acceptable at 314. If additional areas are to be inspected as determined at 316, the process returns to 302 to initiate inspection of a different area or re-inspection of a previously inspected area. Upon completion or during processing, a map of identified defects (on non-defective areas) can be displayed as indicated at 318. In some examples, signal magnitudes are referenced to a signal magnitude associated with initial contact with the structure so that signal variations due to differences in tapping or dragging are reduced. In typical examples, structure defects are identified by examination of spectral peaks.

Example 4

A UAV used to transport a contact assembly can generate acoustic noise which is preferably eliminated or reduced using one or more of the following approaches, or a combination thereof. A distance between the UAV and the acoustic detectors can be made sufficiently large to reduce UAV signal contributions, a difference signal can be obtained to compensate UAV noise, and/or the detected signals can be processed based on a noise profile and Fourier transformed or filtered as discussed below. For example, acoustic detectors can be situated at distances of 0.5 m, 1.0 m. 1.5 m, 2.0 m, 3.0 m or more from a UAV, generally by connecting a striking surface of a hammer to the UAV with a sufficiently long connector.

Example 5

Figure 2B:
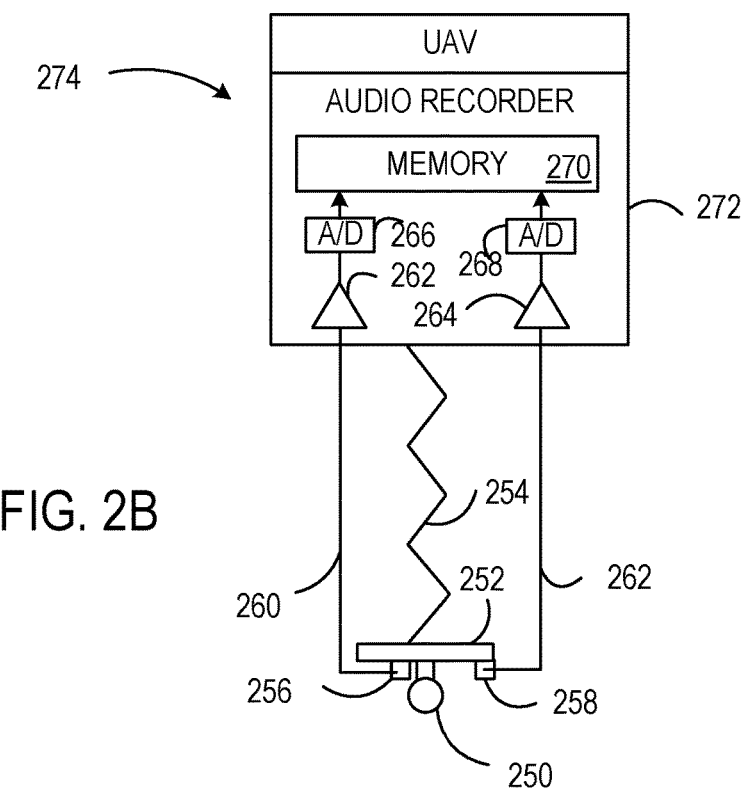
FIG. 2B illustrates placement of acoustic detectors to reduce UAV noise in a difference signal.
Figure 4:
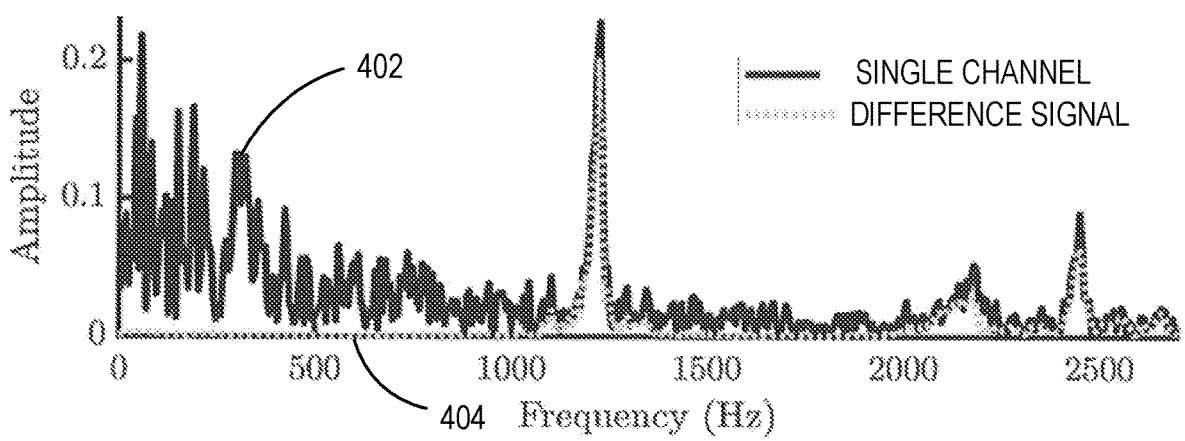
FIG. 4 illustrates noise reduction in a detected acoustic signal using two acoustic detectors to produce a difference signal.

A difference-signal based approach to reducing noise in detected audio signals is illustrated in FIG. 2B. A ball 250 is secured to a mounting plate 252 that is coupled to a UAV 274 with a spring 254. Acoustic detectors 256, 258 are situated with different lateral displacements with respect to the ball 250 but at substantially the same distance from the UAV 274. In one example, acoustic detectors are situated at 25.4 mm and 50.8 mm lateral distances from the ball 250. As a result, the acoustic detectors 256, 258 receive substantially the same acoustic signal from the UAV 274 but receive signals of different magnitudes from a test structure in response to tapping, dragging, or other contact with the ball 250. Detected acoustic signals from the acoustic detectors 256, 258 are coupled to respective amplifiers and/or filters 262, 264 and A/D convertors 266, 268. Digitized acoustic signals are stored in a memory 270. The digital acoustic signals are processed to produce a difference signal using processing hardware in the UAV 274 or provided in an audio recorder 272. The difference signal will tend to reduce noise that is common to both acoustic detectors. In this example, the difference signal is produced digitally, but in other examples, an analog difference signal can be used as provided by, for example, a differential amplifier. Although not shown, in many examples, multiple detected acoustic signals are acquired and averaged to reduce noise. Results obtained with difference-based noise reduction with acoustic signals at a delamination are shown in the spectral plots of FIG. 4. A curve 402 corresponds to a detected signal from a single transducer while curve 404 is a spectrum associated with a difference signal. Acoustic transducers situated so that UAV generated noise signals are within about 10%. 5%, 2%, 1%, 0.5%, or less are referred to herein as being substantially equidistant. Two acoustic transducers situated so that acoustic signals from a substrate differ by 10%, 20%, 25%, 50%, or more are referred to herein as being at substantially different distances. In producing difference signals, electronic gain can be adjust so that UAV noise reduction is improved.

Example 6

Figure 9A:
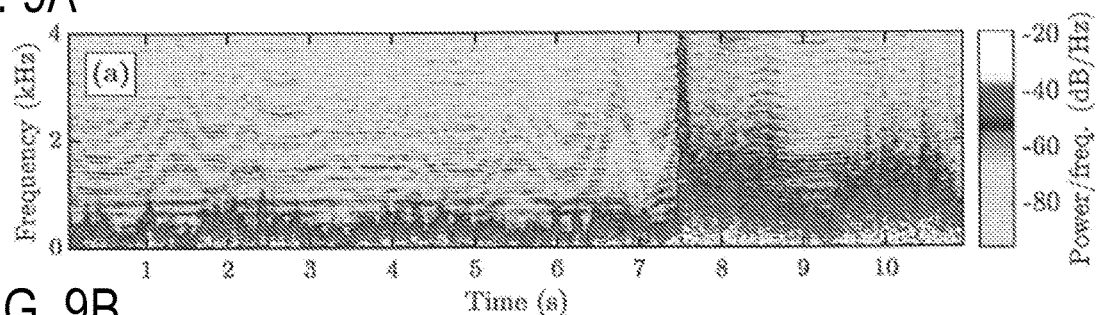
FIG. 9A illustrates spectra as a function of time for a single acoustic channel signal in a drag test.
Figure 9B:
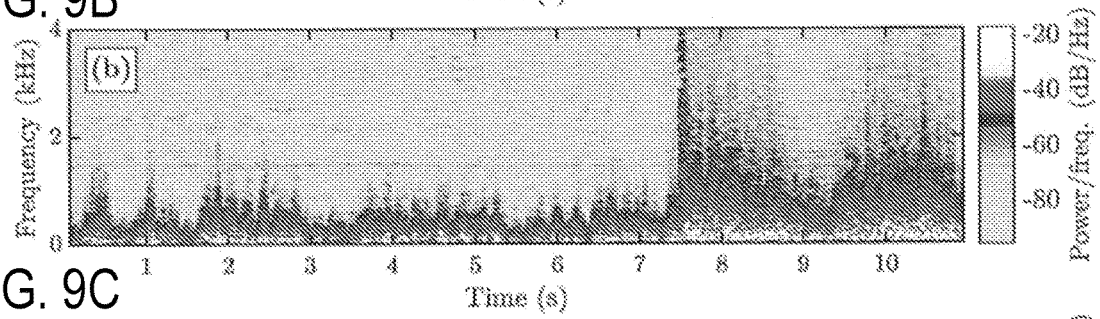
FIG. 9B illustrates spectra as a function of time for a differential acoustic signal in the drag test associated with FIG. 9A.
Figure 9C:
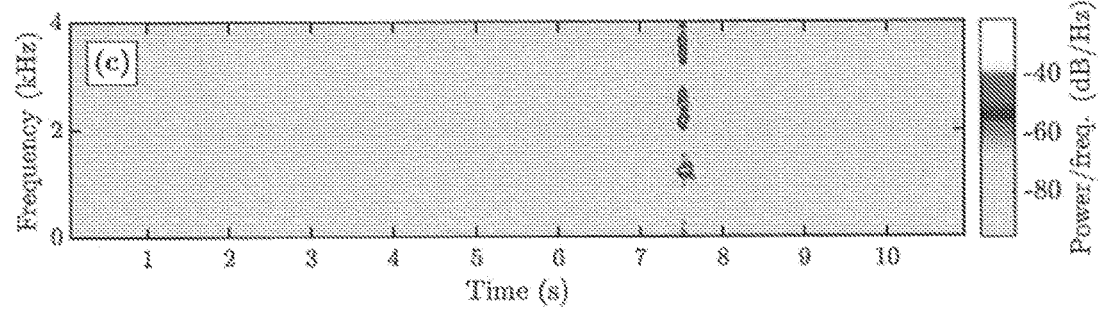
FIG. 9C illustrates spectra as a function of time after processing the differential acoustic signal associated with FIG. 9B using a noise profile.

Referring to FIGS. 9A-9C, in another approach, acoustic signals are recorded in response to contact with a surface of a structure under inspection. FIG. 9A illustrates spectra of a single acoustic channel as a function of time. Contact/impact with a structure to be inspected occurs at about t=7.5 s; the acoustic signal spectra prior to this time corresponds to background noise, generally UAV noise. Spectra as a function of time for a difference signal (two acoustic detectors) are shown in FIG. 9B; background noise is reduced, but is still apparent. To further reduce noise, a section of the pre-contact acoustic signal (tapping method) or a section of the acoustic signal not associated with a defect (drag method) can be is used to generate a spectral noise profile and this spectral noise profile is then applied. FIG. 9C illustrates spectra as a function of time for a difference signal for which a noise profile has been used to further reduce noise. Noise contributions are removed, and spectra associated with contact remain. Noise-reduced spectra as shown in FIG. 9C simplify identification of defects in the structure under evaluation. In the example of FIG. 9C, approximately 0.5 s of the acoustic difference signal was used to obtain the spectral noise profile. FIG. 9C shows a structure defect at a contact location at about t=7.5 s. Location is established based on a starting contact location and a velocity at which the UAV is moved across a surface of a structure. In any of the above-methods, spectral filtering can be used. For example, signal contributions at frequencies above about 4 kHz (in this example) can be removed with a spectral filter.

Example 7

FIGS. 5A-5B illustrate unprocessed detected acoustic signal data (single channel) obtained by a drag test (FIG. 5A) and a tap test (FIG. 5B) in evaluation of a concrete slab that includes voids. FIGS. 6A-6B show corresponding spectra. For reference, FIGS. 7A-7B illustrate unprocessed detected acoustic signal data obtained by a drag test (FIG. 7A) and a tap test (FIG. 7B) in evaluation of a control concrete slab without voids. FIGS. 8A-8B show corresponding spectra. As shown in FIGS. 6A and 8A, a delamination is associated with wider spectral spreads in response to a drag test. The wider spectral spread is evident in FIG. 6A which has a frequency spread approximately between 0-3 kHz with a spike exceeding 4 kHz matching a location of a defect. In contrast FIG. 8A indicates a narrower spread between 0-2.5 kHz.

Example 8

To inspect an upper surface (such as a top surface of a deck), a UAV system is controlled to maintain a flight path that is parallel to the surface. A constant distance of about 5 m to 10 m above a location of interest on the upper surface can be used, depending on a length of a connector that couples the hammer to the UAV. During the flight, the UAV then drags the hammer across the surface and acoustic signals are detected and stored. Inspection using a lower surface (such as a bottom surface of a deck) can be similar, with the UAV controlled so that the hammer is in contact with the lower surface. Using a UAV-based inspection system, a lower surface can be readily inspected and inspection can be no more difficult than inspection of an upper surface. Moreover, for bridge inspections, because the UAV is below the deck, it is not necessary to restrict access to or close the bridge or one or more lanes to traffic. To inspect a side (vertical) surface, the UAV is directed along a flight path that is parallel to the surface while keeping the hammer in contact with the surface. While flight paths are referred to as parallel, flight paths can vary considerably if surfaces that are non-planar are to be inspected. In some cases, a connector is flexible enough so that a parallel flight path maintains contact even for non-planar surfaces.

Example 9

Figure 10:
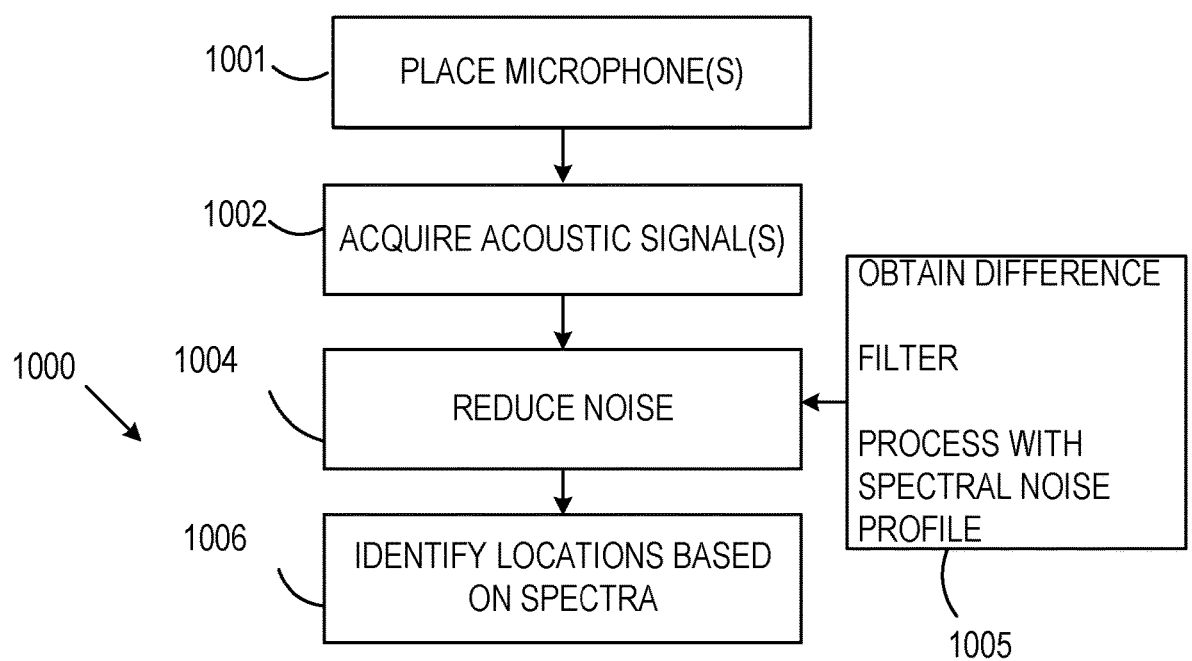
FIG. 10 illustrates a representative method of processing of detected acoustic signals.

With reference to FIG. 10, methods 1000 for processing detected acoustic signals include placing acoustic detectors at 1001 to permit differencing to reduce UAV noise. At 1002, one or more acoustic signals are acquired from one or more acoustic detectors. At 1004, signal noise is reduced by applying one or more processes from a library 1005 such as filtering, obtaining a difference signal, or processing with a spectral noise profile. At 1006, one or more location are identified, typically based on spectra associated with the noise-reduced signal.

Example 10

Figure 11:
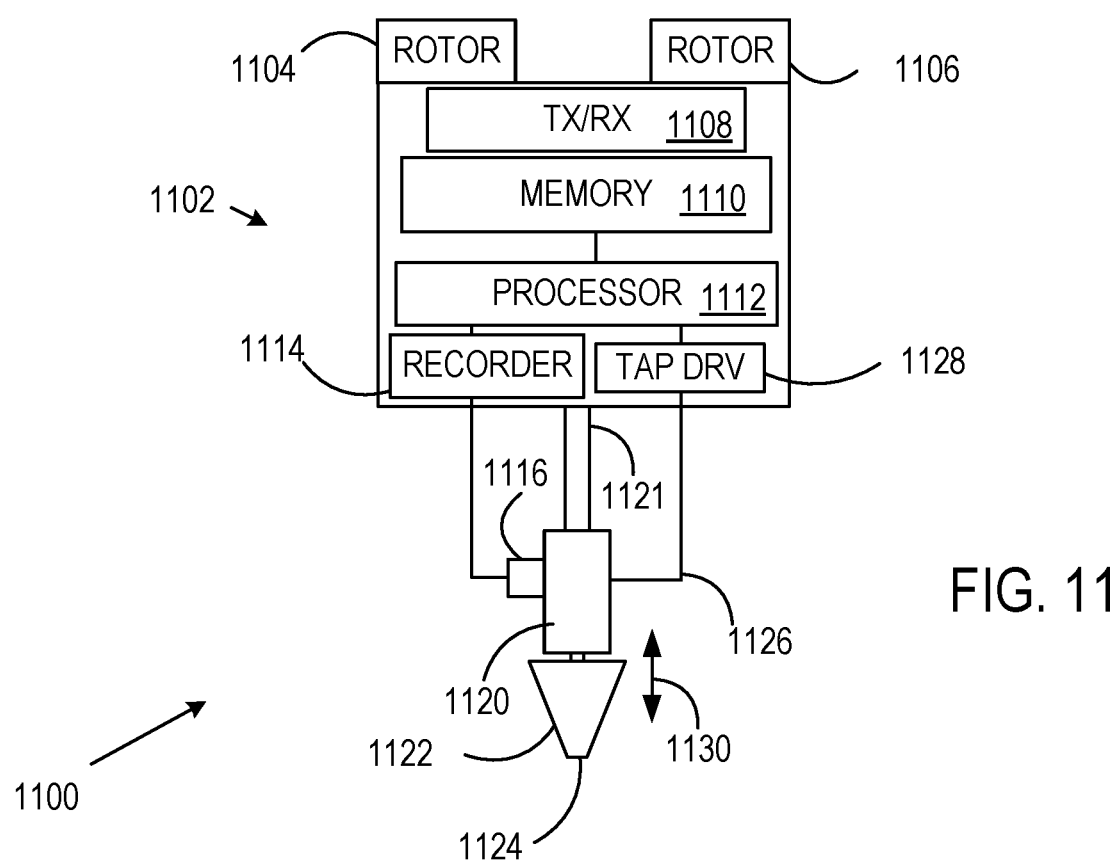
FIG. 11 illustrates an inspection apparatus that includes an actuator operable to tap a surface with a hammer or to extend a hammer so a UAV can drag a hammer across a surface.

Referring to FIG. 11, an apparatus 1100 for structural evaluation includes a UAV 1102 having representative rotors 1104, 1106 and includes a transceiver 1108 for sending and receiving measurement data associated with structure assessment as well as communications associated with UAV path and UAV control generally (including flight path). A memory 1110 is coupled to store measurement data and processor-executable instructions for UAV operation and structure assessment, and is in communication with a processor 1112. An audio or other acoustic receiver 1114 is coupled to an acoustic transducer 1116 that is secured to an actuator 1118. A hammer 1122 have a contact surface 1124 for tapping or dragging on a structure is operable connected to the actuator 1118 so that the hammer 1120 is movable in directions indicated by an arrow 1130. The actuator 1120 can be secured to the UAV 1102 with an extension 1121 such as a post or other object so that the acoustic detector 1120 is sufficiently distant from the rotors 1104, 1106 to reduce noise in detected acoustic signals. Additional acoustic detectors can be used as discussed above. If desired, the memory 1100 can be coupled to store noise characteristics to aid in noise removal or attenuation in acoustic signal measurements. An electromagnetic actuator such as a push or pull type actuator which is operable to tap the contact surface 1124 against a selected surface can be used, or any other type of actuator such as a piezoelectric actuator. The actuator 1120 is typically operated in response to control signals provided by drive circuitry or other actuator drive components as controlled by the processor 1112. Use of an actuator permits control of a tap rate by the processor 1112, and the UAV 102 is navigated to be within range of a surface of interest with an extension provided by the actuator.

In the example of FIG. 11, an actuator is mounted on a shaft or other extension from a UAV, but in other examples, the actuator can be secured directly to the UAV, and an extension used to distance a hammer and an acoustic detector. An extension is not required. As discussed previously, detected acoustic signals can be processed on board the UAV, transmitted without processing, or noise-reduced and then transmitted for further processing. In some cases, two acoustic signals or a differential acoustic signal are transmitted, or an acoustic noise signal recorded during, prior, or after an acoustic signal used for inspection is acquired is transmitted for remote noise reduction.

ADDITIONAL GENERAL CONSIDERATIONS

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

In view of the many possible embodiments to which the principles of the disclosed technology may be applied, it should be recognized that the illustrated embodiments are only preferred examples and should not be taken as limiting the scope of the disclosure. We therefore claim as all that comes within the scope and spirit of the appended claims.

We claim:

1. A method, comprising:
    positioning an acoustic signal generator with respect to a selected region of a structure with an unmanned aerial vehicle (UAV), wherein the acoustic signal generator is connected to the unmanned aerial vehicle;
    coupling an acoustic signal into the structure at the selected region using the acoustic signal generator; and
    with an acoustic detector connected to the UAV, detecting at least one acoustic signal received from the structure, wherein the detected acoustic signal is responsive to the acoustic signal coupled to the structure;
    wherein the acoustic signal generator includes a hammer having a contact surface, and the UAV is moved so that the contact surface of the hammer contacts a surface that is acoustically coupled to the selected region of the structure;
    wherein the acoustic signal is coupled into the structure by dragging the contact surface of the hammer with the UAV.

2. The method of claim 1, further comprising transmitting the detected acoustic signal to a ground-based receiver.

3. The method of claim 1, further comprising processing the detected acoustic signal to identify one or more portions of the structure as having a structural anomaly or a material defect.

4. The method of claim 1, further comprising processing the detected acoustic signal and indicating that the structure and associate material exhibits no structural anomalies or material defects.

5. The method of claim 1, wherein the hammer is a ball end that is flexibly coupled to the UAV.

6. The method of claim 1, wherein the hammer is coupled to the UAV with a spring.

7. The method of claim 1, further comprising detecting first and second acoustic signals with first and second acoustic detectors connected to the UAV, respectively, wherein the first and second detected acoustic signals are responsive to the acoustic signal coupled to the structure.

8. The method of claim 7, further comprising obtaining a difference signal based on the first and second detected signals, and identifying one or more portions of the structure as having a material or structural anomaly based on the difference signal.

9. A method, comprising:
    positioning an acoustic signal generator with respect to a selected region of a structure with an unmanned aerial vehicle (UAV), wherein the acoustic signal generator is connected to the unmanned aerial vehicle;
    coupling an acoustic signal into the structure at the selected region using the acoustic signal generator; and
    with an acoustic detector connected to the UAV, detecting at least one acoustic signal received from the structure, wherein the detected acoustic signal is responsive to the acoustic signal coupled to the structure, wherein the acoustic detector is situated at least 1 m from the UAV.

10. An inspection apparatus, comprising:
a UAV;
an acoustic signal generator coupled to the UAV, the acoustic signal generator comprising a hammer having a contact surface situated with respect to the UAV to be movable by the UAV to produce an acoustic signal in a structure; and
an acoustic detector coupled to the UAV and situated to receive acoustic signals from the structure in response to the acoustic signal produced in the structure;
wherein the acoustic signal generator and the UAV are configured such that movement of the UAV causes the contact surface of the hammer to contact a surface that is acoustically coupled to the selected region of the structure;
wherein the acoustic signal is coupled into the structure by either dragging the contact surface of the hammer with the UAV or moving the UAV so that the contact surface of the hammer makes a series of contacts with a surface acoustically coupled to the selected region of the structure.

11. The inspection apparatus of claim 10, wherein the hammer comprises a ball end.

12. The inspection apparatus of claim 11, further comprising an audio recorder coupled to the acoustic detector and configured to produce digital audio signals based on the acoustic signals received by the acoustic detector.

13. The inspection apparatus of claim 12, further comprising a processor coupled to produce at least one spectrum based on the digital audio signals.

14. The inspection apparatus of claim 13, wherein the acoustic detector comprises first and second acoustic detectors situated to have substantially the same acoustic coupling to the UAV and substantially different acoustic couplings to the contact surface of the hammer, the audio recorder is coupled to produce digital audio signals based on a difference between detected audio signals from the first and second detectors, and the audio processor is coupled to produce the at least one spectrum based on the difference.

15. The inspection apparatus of claim 11, further comprising:
an audio recorder coupled to the acoustic detector and configured to produce digital audio signals based on the acoustic signals received by the acoustic detector; and
a transmitter coupled to audio recorder and operable to wirelessly transmit the digital audio signals.

16. The inspection apparatus of claim 10, further comprising a spring that secures the hammer to the UAV.

17. The inspection apparatus of claim 10, further comprising an actuator coupled to the hammer and operable to move the hammer to produce the acoustic signal in the structure.

18. A method, comprising:
with an unmanned aerial vehicle (UAV), moving a hammer so as to drag a contact surface of the hammer or tap the contact surface on a region of a surface of a structure to apply an acoustic signal to the structure;
detecting at least one acoustic signal from the structure produced in response to the applied acoustic signal, wherein the acoustic signal is detected with at least one microphone that is secured to the UAV; and
based on a spectrum of the detected acoustic signal, indicating a location of a defect in the structure;
wherein the acoustic signal is coupled into the structure by either dragging the contact surface of the hammer with the UAV or moving the UAV so that the contact surface of the hammer makes a series of contacts with a surface acoustically coupled to the structure.

19. The method of claim 18, wherein the defect is one or more of a delamination, crack, void, corrosion, or debonding of a bridge deck.

20. The method of claim 18, wherein the defect is one or more of a delamination, crack, void, corrosion, or debonding in a dam, power plant, or building.

21. An inspection apparatus, comprising:
a UAV;
a hammer connected to the UAV and having a contact surface;
at least one microphone secured to the UAV; and
an audio recorder coupled to the at least one microphone to receive an acoustic signal from a structure produced in response to dragging or tapping the contact surface of the hammer on the structure and store a corresponding digital acoustic signal;
wherein the acoustic signal is produced by either using the UAV to drag the contact surface of the hammer along a surface of the structure or moving the UAV so that the contact surface of the hammer makes a series of contacts with the surface of the structure.

22. The inspection apparatus of claim 21, further comprising a processor coupled to receive the digital acoustic signal, reduce UAV noise in the digital acoustic signal, and produce at least one spectrum associated with the noise-reduced digital acoustic signal.

23. The inspection apparatus of claim 21, further comprising a transmitter coupled to the audio recorder and configured to transmit the digital acoustic signal.

24. The inspection apparatus of claim 21, further comprising:
a processor coupled to receive the digital acoustic signal and reduce UAV noise in the digital acoustic signal; and
a transmitter coupled to the processor and configured to transmit the noise-reduced digital acoustic signal.

25. A method, comprising:
positioning an acoustic signal generator with respect to a selected region of a structure with an unmanned aerial vehicle (UAV), wherein the acoustic signal generator is connected to the unmanned aerial vehicle;
coupling an acoustic signal into the structure at the selected region using the acoustic signal generator; and
with an acoustic detector connected to the UAV, detecting at least one acoustic signal received from the structure, wherein the detected acoustic signal is responsive to the acoustic signal coupled to the structure;
wherein the acoustic signal generator includes a hammer having a contact surface;
wherein the coupling the acoustic signal into the structure at the selected region using the acoustic signal generator comprises moving the UAV so that the contact surface of the hammer makes a series of contacts with a surface acoustically coupled to the selected region of the structure and coupling the acoustic signal into the structure as the UAV is moved along the surface acoustically coupled to the selected region of the structure.

* * * * *